United States Patent [19]

O'Neill et al.

[11] 3,899,580

[45] Aug. 12, 1975

[54] ANTI-INFLAMMATORY TOPICAL GEL

[75] Inventors: Joseph L. O'Neill, Lafayette Hill, Pa.; Joseph V. Bondi, East Brunswick, N.J.

[73] Assignee: Merck & Co., Inc., Rahway, N.J.

[22] Filed: May 8, 1974

[21] Appl. No.: 467,982

Related U.S. Application Data

[63] Continuation-in-part of Ser. No. 267,743, June 30, 1972, abandoned, which is a continuation-in-part of Ser. No. 261,186, June 9, 1972, abandoned.

[52] U.S. Cl. .................... 424/241; 424/243
[51] Int. Cl.$^2$ .......................... A61K 17/16
[58] Field of Search ................ 424/241, 243

[56] References Cited
UNITED STATES PATENTS

| | | | |
|---|---|---|---|
| 3,067,194 | 12/1962 | Tishler et al. ................... | 260/239.5 |
| 3,485,915 | 12/1969 | Gerstein et al. .................. | 424/81 |
| 3,749,773 | 7/1973 | Ninger et al. .................... | 424/81 |
| 3,856,954 | 12/1974 | Jackson ........................... | 424/241 |

FOREIGN PATENTS OR APPLICATIONS 1,090,492   11/1967   United Kingdom

OTHER PUBLICATIONS

Secard Drug & Cosmetic Industry 89(6):6 pp. Dec. 1961 "Carbopol Cosmetics."

Secard Drug & Cosmetic Industry 90(1):4 pp. Jan. 1962, "Carbopol Pharmaceuticals."

*Primary Examiner*—Shep K. Rose
*Attorney, Agent, or Firm*—Frank M. Mahon; Harry E. Westlake, Jr.; Rudolph J. Anderson, Jr.

[57] ABSTRACT

Methods and compositions for topical application of an anti-inflammatory agent selected from the group consisting of 2'-(4-pyridyl)-6,16α-dimethyl-11β,17α,21-trihydroxypregna-4,6-dieno[3,2-c]-pyrazol-20-one, dexamethasone alcohol, prednisolone alcohol, and hydrocortisone alcohol in a clear water-white gel vehicle.

8 Claims, No Drawings

ANTI-INFLAMMATORY TOPICAL GEL

This application is a continuation-in-part of our co-pending application Ser. No. 267,743 filed June 30, 1972, now abandoned, which in turn is a continuation-in-part of U.S. application Serial No. 261,186, filed June 9, 1972, now abandoned.

This invention relates to compositions and methods of administering topically an anti-inflammatory agent selected from the group consisting of 2'-(4-pyridyl)-6,16α-dimethyl-11β,17α,21-trihydroxypregna-4,6-dieno[3,2-c]-pyrazol-20-one, dexamethasone alcohol, prednisolone alcohol and hydrocortisone alcohol. More specifically, the invention relates to topical pharmaceutical compositions which contain said anti-inflammatory agent as an active ingredient and to methods of treating inflammatory conditions in patients by administering the active ingredient topically in a clear water-white gel vehicle. The anti-inflammatory agents disclosed herein are of value in the topical treatment of dermatological disorders or like conditions responsive to anti-inflammatory drugs. Included within this category are diseases such as dermatitis (actinic, atopic, contact, eczematoid, seborrheic and stasis), dermatitis herpetiformis, lichen planus, neurodermatitis, intitrigo, lichen simplex chronicus, pruritus and psoriasis.

The anti-finflammatory agent must be in the molecular state, such as a solution, which obviates a dissolution rate, in order to obtain maximum therapeutic activity. The topical clear water-white vehicle disclosed herein containing the steroid has the advantage of a solution, i.e., the product is a clear water-white gel that demonstrates the solubility of the steroid within the vehicle. This concept is in contrast with the teachings of the prior art since: (1) the prior art teaches an opaque emulsion-type cream formulation which may mask crystallization of the steroid within the matrix of a water insoluble component or the aqueous phase, (2) the prior art teaches formulations which include a combination of miscible volatile and non-volatile solvents as a vehicle wherein the volatile solvent is the predominate component and (3) the prior art teaches the use of carbopol as a thickening agent. Applicants have found, however, that surprisingly, when carbopol is employed in the formulations of this invention, the stability of the active agent in the formulation is decreased. The concept of this invention is in further contrast with the prior art which specifically teaches a combination of thickening agents (hydroxypropyl cellulose and a carboxy polymer) in topical formulations. For example see U.S. Pat. No. 3,485,915, and German Offenlegungsschrift No. 2,015,300.

It is an object of this invention to provide a potent topically active anti-inflammatory formulation which shows a good separation between local and systemic activities.

It is a further object of this invention to provide a topical dosage form of the active agent having optimum stability and optimum release characteristics from a non-irritating vehicle to obtain maximum therapeutic effect.

Another object of this invention is to provide a topical vehicle which possesses maximum skin penetrating properties, thus requiring a small quantity of the active agent for an effective local treatment.

In accordance with this invention, it is found that an anti-inflammatory agent selected from the group consisting of 2'-(4-pyridyl)-6,16α-dimethyl-11β,17α, 21-trihydroxypregna-4,6-dieno[3,2-c]-pyrazol-20-one, dexamethasone alcohol, prednisolone alcohol and hydrocortisone alcohol can be administered to humans by applying topically to the skin of the patient a solution of the active agent in a clear water-white gel vehicle, thereby obtaining local activity of the active agent. Also, it is found that the topical administration of this composition results in local activity rather than systemic activity of the steroid thus alleviating the necessity of large dosages and avoiding side effects and other unfavorable conditions. The active agent in a clear water-white gel vehicle is highly substantive to the skin, possesses a high degree of local skin penetrating activity and, in addition, can be applied topically to the skin without occlusion.

The pharmaceutically acceptable salts of the 2'-(4-pyridyl)-6,16α-dimethyl-11β,17α,21-trihydroxypregna-4,6-dieno[3,2-c]pyrazol-20-one, described above are to be considered with the scope of the invention. Representative examples of said pharmaceutically acceptable salts are hydrohalide, perchlorate, picrate, acetate, sulfate, phthalate, succinate, citrate, lactate and nitrate.

In order to ensure that a sufficient amount of the anti-inflammatory agent is absorbed externally by topical application, it is necessary to employ a vehicle which will permit an efficient absorption of the steroid through the skin. The essential ingredients of the clear water-white gel vehicle employed herein are water, at least one solvent and a thickening agent.

The solvent may constitute from about 60% to 90% of the gel vehicle. Representative solvents are ethyl alcohol, isopropyl alcohol, propylene glycol, glycerine, 2-octyl dodecanol and methyl pyrrolidine and mixtures thereof. Of particular preference is a combination of isopropyl alcohol and propylene glycol at a 0.5:1 to 0.6:1 ratio constituting from about 80 to 90 percent of the gel vehicle. The solubility of the active agent in a solvent system should be at a minimum to obtain maximum partitioning of the steroid from the vehicle to the skin.

The thickening agent may constitute from 0.5 to 4 percent of the gel vehicle. Preferably, the thickening agent is hydroxypropyl cellulose.

Water may constitute from about 8 to 18 percent of the gel vehicle. Of particular preference is from about 10 to 15 percent by weight.

Optionally, a stabilizing agent may be employed in the practice of the invention. When employed, said stabilizing agent may constitute from about 0.01 to 0.1 percent of the gel vehicle. Representative stabilizing agents are disodium edetate, sodium citrate, dipotassium edetate and citric acid. Of particular preference is disodium edetate at 0.05 percent by weight.

The pharmaceutical compositions of this invention contain a clear water-white gel vehicle and an anti-inflammatory agent selected from the group consisting of 2'-(4-pyridyl)-6,16α-dimethyl-11β,17α,21-trihydroxypregna-4,6-dieno[3,2-c]-pyrazol-20-one, dexamethasone alcohol, prednisolone alcohol, and hydrocortisone alcohol as the essential components thereof. The vehicle may constitute from 99.0 to 99.999 percent of the total formulation weight. The active ingredient may constitute from 0.001 to 1.0 percent of the total formulation weight. Of particular preference is the combination of from about 0.01 to 0.25 percent of the active ingredient and 99.75 to 99.99 percent of the clear water-white gel vehicle to the total weight of the composition. The formulations included herein are effective in the treatment of topical inflammatory conditions in patients.

It will be understood, however, that the specific dose level for any particular patient will depend upon a variety of factors including the age, body weight, general health, sex, diet, time of administration, rate of excretion, drug combination and the severity of the particular area undergoing therapy. Of particular preference is the application of the formulations of this invention to the skin 2 to 4 times daily.

The anti-inflammatory agents disclosed above generally are well-known in the art and processes for their preparation can be found throughout the literature. 2'-(4-pyridyl)-6,16α-dimethyl-11,β,17α,21-trihydroxypregna-4, 6-dieno[3,2-c]-pyrazol-20-one, is disclosed in co-pending U.S. application Ser. No. 396,287, filed Sept. 11, 1973, now U.S. Pat. No. 3,832,346, issued Aug. 27, 1974, which is a continuation-in-part of U.S. application Serial No. 167,802, filed July 30, 1971, now abandoned, may be prepared as follows:

A mixture of 7.30 g. of 4-chloropyridine, 8.63 g. of benzoyl hydrazine and 25 cc of anhydrous ethanol is heated in a bomb tube under pressure at a temperature of 120°C, for a period of approximately 14 hours. The reaction mixture is cooled, extracted first with hot ethanol, and then with hot water, and the aqueous and ethanol extracts are combined and evaporated to dryness. The residue material is crystallized twice from a mixture of one part methanol to two parts ethyl acetate to give N-(4-pyridyl) benzyhydrazide; m.p. 225°–231°C.

A mixture of 2.08 g. of N-(4-pyridyl) benzhydrazide and 15 cc of 23 percent aqueous hydrochloric acid solution is heated under reflux for a period of about 3 hours. The resulting mixture is cooled to about 0°C, filtered, and the filtered solution is evaporated to dryness. The crystalline product is washed with one 15 cc-portion of hot methanol, and with three 10 cc-portions of cold methanol; the crystalline material is then dried to give substantially pure 4-hydrazino-pyridine hydrochloride m.p. 245°–250°C.

A solution containing approximately 0.4 g of 4-hydrazino-pyridine hydrochloride dissolved in about 12 cc of an 8:2 mixture of ethanol-water is added to a solution containing two molecular equivalents of potassium acetate dissolved in 5 cc of water. To the resulting mixture is added a solution containing about one gram of 2-hydroxymethylene-6,16α-dimethyl-11β-hydroxy-17,20:20, 21-bis (methylenedioxy)-pregna-4,6-dieno-3-one, dissolved in about 25 cc of warm ethanol. The resulting solution is heated at reflux temperature for a period of approximately 4 hours, at the end of which time about 10 cc of solvent is evaporated, whereupon crystalline material separates from the reaction solution. The resulting crystalline slurry is diluted with an equal volume of water, and the insoluble material is recovered by filtration and dried to give about 1.3 g. of crude product which, upon crystallization from methylene chloride-ethanol solution, gives substantially pure 2'-(4-pyridyl)-6,16α-dimethyl-11β-hydroxy-17,20:20, 21-bis (methylenedioxy)-pregna-4,6-dieno[3,2-c]-pyrazole; m.p. 276°–283°C. The mother liquors from the recrystallization are subjected to thin-layer chromatography on silica gel, utilizing 8 percent methanol as eluting solvent, to give an additional 2'-(pyridyl)-6,16α-dimethyl-11β-hydroxy-17, 20:20, 21-bis(methylenedioxy)-pregna-4,6-dieno[3,2-c]-pyrazole.

A solution containing 0.365 g. of 2'-(4-pyridyl)-6,16α-dimethyl-11β-hydroxy-17,20:20,21-bis(methylenedioxy)-pregna-4,6-dieno[3,2-c]-pyrazole dissolved in 7 ml. of a 6:4 mixture of formic acid and water, is heated at a temperature of about 95°–98°C for a period of approximately twenty-five minutes. The reaction mixture is cooled to about 0°C, made alkaline by the addition of aqueous sodium hydroxide solution, and the resulting suspension is extracted with three 7 ml.-portions of ethyl acetate. The combined ethyl acetate extracts are dried over anhydrous magnesium sulfate, and the dry ethyl acetate solution is evaporated in vacuo to give crude material which, upon recrystallization from methylene chloride, gives substantially pure 2'-(4-pyridyl-6,16α-dimethyl-20-oxo-11β,17α-21-trihydroxy-pregna-4,6-dieno[3,2-c]-pyrazole; m.p. 209°–213°C. The mother liquors from the methylene chloride recrystallization are subjected to thin-layer chromatography on silica gel, utilizing a 9:1 mixture of chloroform-methanol as eluting solvent, to give additional 2'-(4-pyridyl)-6,16α-dimethyl-11β,17α,21-trihydroxypregna-4,6-dieno[3,2-c]-pyrazol-20-one.

The following examples illustrate the preparation of the various topical compositions of the invention.

The examples should be construed as illustration of the invention rather than limitation thereof.

EXAMPLE I

| Topical Gel | |
| Ingredients | %W/W |
| --- | --- |
| 2'-(4-pyridyl)-6,16α-dimethyl-11β,17α,21-trihydroxypregna 4,6-dieno[3,2-c]-pyrazol-20-one | 0.10 |
| Disodium edetate | 0.05 |
| Purified water | 13.00 |
| Hydroxypropyl cellulose | 2.60 |
| Propylene glycol | 84.25 |

To an agitated hot water solution containing disodium edetate at 60°C. – 80°C. is added the hydroxypropyl cellulose. This mixture is agitated until the hydroxypropyl cellulose is completely dispersed and wetted. While agitating said mixture, a solution which contains 2'-(4-pyridyl)-6,16α-dimethyl-11β,17α,21-trihydroxypregna-4,6-dieno[3,2-c]-pyrazol-20-one and propylene glycol is added. The resulting gel mixture is aged while agitating at room temperature for approximately 15 minutes.

Other active agents such as dexamethasone alcohol, prednisolone alcohol or hydrocortisone alcohol can be substituted for 2'-(4-pyridyl)-6,16α-dimethyl-11β,17α, 21-trihydroxypregna-4,6-dieno[3,2-c]-pyrazol-20-one.

EXAMPLE 2

| Topical Gel | |
| Ingredients | %w/w |
| --- | --- |
| 2'-(4-pyridyl)-6,16α-dimethyl-11β, 17α,21-trihydroxypregna-4,6-dieno [3,2-c]-pyrazol-20-one | 0.001 |
| Disodium edetate | 0.01 |
| Purified water | 13.000 |
| Hydroxypropyl cellulose | 2.600 |
| Propylene glycol | 84.398 |

To an agitated hot water solution containing disodium edetate at 60°–80°C. is added the hydroxypropyl cellulose. This mixture is agitated until the hydroxypropyl cellulose is completely dispersed and wetted. While agitating said mixture, a solution which contains 2′-(4-pyridyl)-6,16α-dimethyl-11,β,17α,21-trihydroxypregna-4, 6-dieno[3,2-c]-pyrazol-20-one and propylene glycol is added. The resulting gel mixture is aged while agitating at room temperature for approximately 15 minutes.

Other active agents such as dexamethasone alcohol prednisolone alcohol or hydrocortisone alcohol can be substituted for 2′-(4-pyridyl)-6,16α-dimethyl-11β,7α,21-trihydroxypregna-4,6-dieno[3,2-]-pyrazol-20-one.

EXAMPLE 3

| Topical Gel | |
| Ingredients | %w/w |
| --- | --- |
| 2′-(4-pyridyl)-6,16α-dimethyl-11β,17α,21-trihydroxypregna-4,6-dieno[3,2-c]-pyrazol-20-one | 1.00 |
| Disodium edetate | 0.05 |
| Purified water | 13.00 |
| Hydroxypropyl cellulose | 2.60 |
| Propylene glycol | 83.35 |

To an agitated hot water solution containing disodium edetate at 60°–80°C. is added the hydroxypropyl cellulose is completely dispersed and wetted. While agitating said mixture, a solution which contains 2′-(4-pyridyl)=6,16α-dimethyl-11β-17α,21-trihydroxpregna-4, 6-dieno[3,2-c]-pyrazol-20-one and propylene glycol is added. The resulting gel mixture is aged while agitating at room temperature for approximately 15 minutes.

Other active agents such as dexamethasone alcohol prednisolone alcohol or hydrocortisone alcohol can be substituted for 2′-(4-pyridyl)-6,16α-dimethyl-11β,17α,21-trihydroxypregna-4,6-dieno[3,2-c]-pyrazol-20-one.

EXAMPLE 4

| Topical Gel | |
| Ingredients | %w/w |
| --- | --- |
| 2′-(4-pyridyl)-6,16α-dimethyl-11β,17α,21-trihydroxypregna-4,6-dieno[3,2-c]-pyrazol-20-one | 0.10 |
| Disodium edetate | 0.05 |
| Purified water | 13.00 |
| Hydroxypropyl cellulose | 2.60 |
| Isopropyl alcohol anhydrous | 30.00 |
| Propylene glycol | 54.25 |

To an agitated hot water solution containing disodium edetate at 60°C–80°C. is added the hydroxpropyl cellulose. This mixture is agitated until the hydroxypropyl cellulose is completely dispersed and wetted. While agitating said mixture, a solution which contains 2′-(4-pyridyl)-6,16α-dimethyl-11β-17α,21-trihydroxypregna-4, 6-dieno[3,2-c]-pyrazol-20-one and propylene glycol is added. The resulting gel mixture is aged while agitating at room temperature for approximately 15 minutes.

Other active agents such as dexamethasone alcohol prednisolone alcohol or hydrocortisone alcohol can be substituted for 2′-(4-pyridyl)-6,16α-dimethyl-11β,17α,21-trihydroxypregna-4,6-dieno[3,2-c]-pyrazol-20-one.

EXAMPLE 5

| Topical Gel | |
| Ingredients | %W/W |
| --- | --- |
| 2′-(4-pyridyl)-6,16α-dimethyl-11β,17α,21-trihydroxypregna-4,6-dieno[3,2-c]-pyrazol-20-one | 0.25 |
| Disodium edetate | 0.05 |
| Purified water | 13.00 |
| Hydroxypropyl cellulose | 2.60 |
| Isopropyl alcohol anhydrous | 30.00 |
| Propylene glycol | 54.10 |

To an agitated hot water solution containing disodium edetate at 60°C. – 80°C. is added the hydroxypropyl cellulose. This mixture is agitated until the hydroxypropyl cellulose is completely dispersed and wetted. While agitating said mixture, a solution which contains 2′-(4-pyridyl)-6,16α-dimethyl-11β,17α,21-trihydroxypregna-4, 6-dieno[3,2-c]-pyrazol-20-one, and propylene glycol is added. The resulting gel mixture is aged while agitating at room temperature for approximately 15 minutes.

Other active agents such as dexamethasone alcohol prednisolone alcohol or hydrocortisone alcohol can be substituted for 2′-(4-pyridyl)-6,16α-dimethyl-11β,17α,21-trihydroxypregna-4,6-dieno[3,2-]-pyrazol-20-one.

EXAMPLE 6

| Topical Gel | |
| Ingredients | %W/W |
| --- | --- |
| 2′-(4-pyridyl)-6,16α-dimethyl-11β,17α,21-trihydroxypregna-4,6-dieno[3,2-c]-pyrazol-20-one | 0.15 |
| Disodium edetate | 0.05 |
| Purified water | 13.00 |
| Hydroxypropyl cellulose | 2.60 |
| Isopropyl alcohol anhydrous | 30.00 |
| Propylene glycol | 54.20 |

To an agitated hot water solution containing disodium edetate at 60°C. – 80°C. is added the hydroxypropyl cellulose. This mixture is agitated until the hydroxypropyl cellulose is completely dispersed and wetted. While agitating said mixture, a solution which contains 2′-(4-pyridyl)-6,16α-dimethyl-11β, 17α,21trihydroxypregna-4, 6-dieno[3,2-c]-pyrazol-20-one and propylene glycol is added. The resulting gel mixture is aged while agitating at room temperature for approximately 15 minutes.

Other active agents such as dexamethasone alcohol prednisolone alcohol or hydrocortisone alcohol can be substituted for 2′-(4-pyridyl)-6,16α-dimethyl-11β,17α,21-trihydroxypregna-4,6-dieno[3,2-c]-pyrazol-20-one.

What is claimed is:

1. A method of treating inflammation which comprises applying to the skin a topical formulation comprising a therapeutically effective amount of an anti-inflammatory agent selected from the group consisting of 2'-(4-pyridyl)-6,16α-dimethyl-11β,17α,21-trihydroxypregna-4,6-dieno-[3,2-c]-pyrazol-20-one, dexamethasone alcohol prednisolone alcohol and hydrocortisone alcohol in a clear water-white gel consisting of 0.05 percent by weidht of disodium edetate, from 8 to 18 percent by weight of water, from about 54 to about 84 percent by weight of a solvent selected from the group consisting of propylene glycol and mixtures thereof with isopropyl alcohol, and 2.6 percent by weight of hydroxypropyl cellulose.

2. The method of claim 1 wherein the anti-inflammatory agent is 2'-(4-pyridyl)-6,16α-dimethyl-11β,17α,21-trihydroxypregna-4,6-dieno-[3,2-c]-pyrazol-20-one, and the solvent is propylene glycol.

3. The method of claim 1 wherein the anti-inflammatory agent is 2'-(4-pyridyl)-6,16α-dimethyl-11β,17α,21-trihydroxypregna-4,6-dieno-[3,2-c]-pyrazol-20-one, and the solvent is a mixture of isopropyl alcohol and propylene glycol.

4. The method of claim 3 wherein the isopropyl alcohol and propylene glycol solvent mixture is at a 0.5:1 to 0.6:1 ratio.

5. A topical formulation for treating inflammation which comprises a therapeutically effective amount of an anti-inflammatory agent selected from the group consisting of 2'-(4-pyridyl)-6,16α-dimethyl-11β,17α,21-trihydroxypregna-4,6-dieno-[3,2-c]-pyrazol-20-one, dexamethasone alcohol, prednisolone alcohol and hydrocortisone alcohol in a clear water-white gel consisting of 0.05 percent by weight of disodium edetate, from 8 to 18 percent by weight of water, from about 54 to about 84 percent by weight of a solvent selected from the group consisting of propylene glycol and mixtures thereof with isopropyl alcohol, and 2.6 percent by weight of hydroxypropyl cellulose.

6. The composition of claim 5 wherein the anti-inflammatory agent is 2'-4(pyridyl)-6,16α-dimethyl-11β,17α,21-trihydroxypregna-4,6-dieno-[3,2-c]-pyrazol-20-one, and the solvent is propylene glycol.

7. The composition of claim 5 wherein the anti-inflammatory agent is 2'-4(pyridyl)-6,16α-dimethyl-11β,17α,21-trihydroxypregna-4,6-dieno-[3,2-c]-pryazol-20-one, and the solvent is a mixture of isopropyl alcohol and propylene glycol.

8. The composition of claim 7 wherein the isopropyl alcohol and propylene glycol solvent mixture is at a 0.5:1 to 0.6:1 ratio.

* * * * *